（12）United States Patent
Casavant et al.

(10) Patent No.: US 9,243,510 B2
(45) Date of Patent: Jan. 26, 2016

(54) FLOATING SEAL

(75) Inventors: Matthew Stephen Casavant, Greenville, SC (US); Kevin Thomas McGovern, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 440 days.

(21) Appl. No.: 13/607,847

(22) Filed: Sep. 10, 2012

(65) Prior Publication Data
US 2014/0072418 A1  Mar. 13, 2014

(51) Int. Cl.
*F01D 11/00* (2006.01)
*F16J 15/02* (2006.01)
*F16J 15/32* (2006.01)

(52) U.S. Cl.
CPC ........... *F01D 11/005* (2013.01); *F16J 15/3288* (2013.01)

(58) Field of Classification Search
CPC ............................... F01D 11/005; F01D 25/26
USPC .................... 415/108, 139, 191, 220
See application file for complete search history.

(56) References Cited

U.S. PATENT DOCUMENTS

| 4,902,198 | A | * | 2/1990 | North | F01D 9/04 415/115 |
| 5,158,430 | A | * | 10/1992 | Dixon | F01D 11/005 415/134 |
| 5,263,312 | A | | 11/1993 | Walker et al. | |
| 5,624,227 | A | * | 4/1997 | Farrell | F01D 11/005 277/644 |
| 5,868,398 | A | | 2/1999 | Maier et al. | |
| 6,431,825 | B1 | | 8/2002 | McLean | |
| 7,788,932 | B2 | * | 9/2010 | Kunitake | F01D 9/023 60/797 |
| 8,123,232 | B2 | * | 2/2012 | Fujimoto et al. | 277/644 |
| 2001/0019695 | A1 | * | 9/2001 | Correia | 415/135 |
| 2005/0179215 | A1 | * | 8/2005 | Kono | F01D 11/005 277/628 |
| 2009/0051117 | A1 | * | 2/2009 | Crudgington | 277/310 |

\* cited by examiner

*Primary Examiner* — Igor Kershteyn
(74) *Attorney, Agent, or Firm* — Hoffman Warnick LLC; Ernest G. Cusick

(57) ABSTRACT

A floating seal assembly for sealing two static parts is disclosed. Each static part has an opposing groove, and the opposing grooves define a seal cavity. Floating seal assembly includes a floating circumferential seal having a middle portion and opposing end portions, each opposing end portion is positioned within a groove in one of the static parts, wherein each end portion has a curved side facing a low pressure side of the seal cavity. The floating seal assembly according to embodiments of the invention is pressure driven in that each curved side of the end portions is configured to engage a low pressure side of the seal cavity in response to a pressure differential across the sealing cavity reaching a threshold value.

18 Claims, 5 Drawing Sheets

FLOATING SEAL

FIELD OF THE INVENTION

The present invention relates generally to seals, and more particularly to a floating seal for use between static components in a turbomachine.

BACKGROUND OF THE INVENTION

In turbomachines, such as gas turbines, seals are often used between static parts, for example, between casings, in cooling air paths of guide vanes, between the individual segments of a series of guide vanes, or as a circumferential seal between a housing part of the turbine and a guide vane.

BRIEF DESCRIPTION OF THE INVENTION

A floating seal assembly for sealing two static parts is disclosed. Each static part has an opposing groove, and the opposing grooves define a seal cavity. Floating seal assembly includes a floating circumferential seal having a middle portion and opposing end portions, each opposing end portion is positioned within a groove in one of the static parts, wherein each end portion has a curved side facing a low pressure side of the seal cavity. The floating seal assembly according to embodiments of the invention is pressure driven in that each curved side of the end portions is configured to engage a low pressure side of the seal cavity in response to a pressure differential across the sealing cavity reaching a threshold value.

A first aspect of the invention provides a floating seal assembly for sealing two static parts of a turbomachine, the two static parts having opposing grooves defining a seal cavity, the floating seal assembly comprising: a floating circumferential seal having a middle portion, and opposing end portions, each opposing end portion positioned within a groove in one of the static parts, wherein each end portion has a curved side facing a low pressure side of the seal cavity, each curved side configured to engage the low pressure side of the seal cavity in response to a pressure differential across the seal cavity reaching a threshold value.

A second aspect of the invention provides a turbomachine having an inner casing and an outer casing, the inner and outer casings having opposing grooves defining a seal cavity, the turbomachine comprising: a floating seal assembly for sealing the seal cavity between the inner casing and the outer casing, the floating seal assembly including: a floating circumferential seal having a middle portion, and opposing end portions, each opposing end portion positioned within a groove in one of the static parts, wherein each end portion has a curved side facing a low pressure side of the seal cavity, each curved side configured to engage the low pressure side of the seal cavity in response to a pressure differential across the seal cavity reaching a threshold value.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
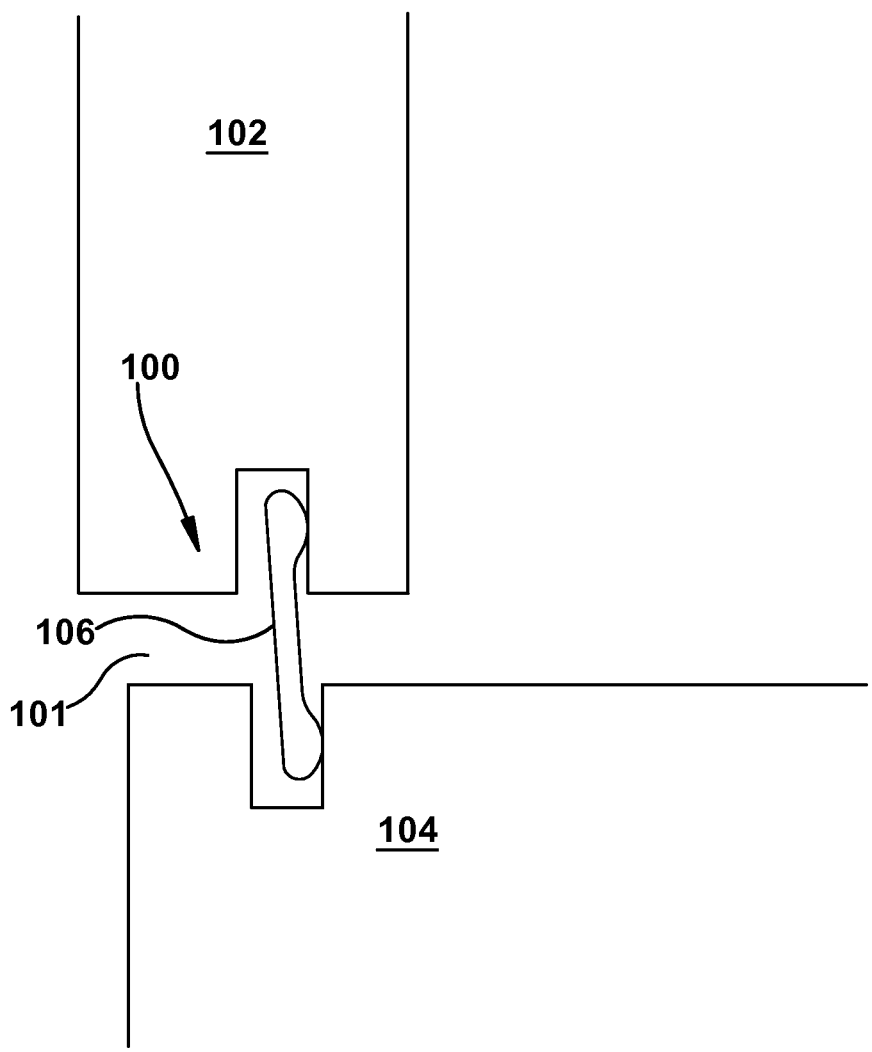
FIG. 1 shows a cross-sectional view of a circumferential floating seal between two static parts according to an embodiment of the invention.

Turning to FIG. 1, a floating seal assembly 100 for sealing a seal cavity 101 between static parts 102, 104 is disclosed. As shown in more detail in the enlarged cross-sectional view in FIG. 2, seal cavity 101 has a higher pressure side, $P_H$, and a lower pressure side, $P_L$. Although FIGS. 1-5 are shown and discussed with respect to a seal between static parts in a gas turbine, it is understood that the teachings of the various embodiments of the invention may be similarly applied to other turbomachines and that a gas turbine is merely used as an example of one type of turbomachine to describe the aspects of the invention.

Figure 2:
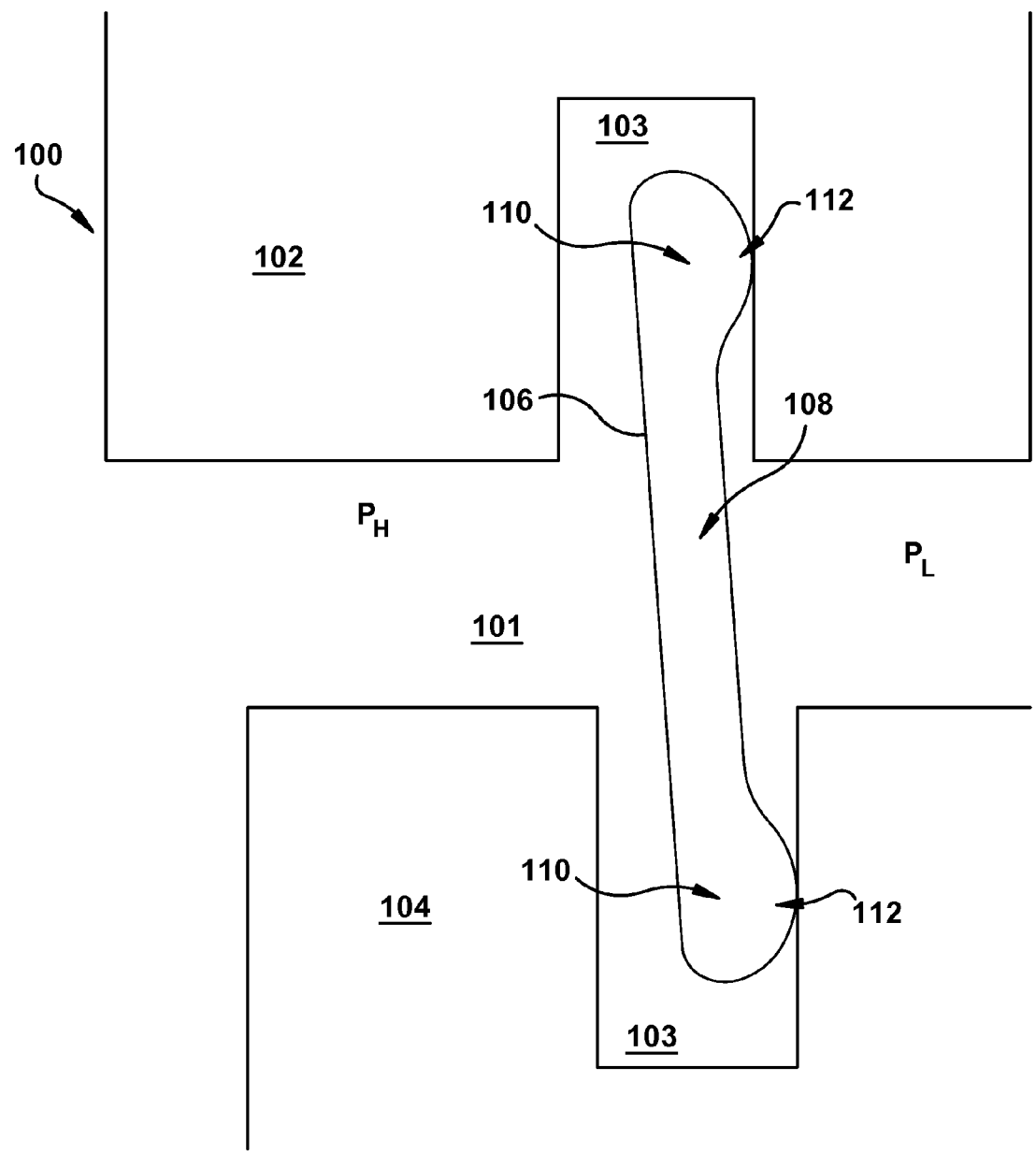
FIG. 2 shows a cross-sectional view of a circumferential floating seal in a sealing state, according to an embodiment of the invention.

As shown in more detail in the cross-sectional view shown in FIG. 2, each static part 102, 104 has an opposing groove 103. Floating seal assembly 100 includes a floating circumferential seal 106 with a so-called "dog-bone" cross-sectional shape, i.e., a cross-sectional view of seal 106 has a middle portion 108 and opposing end portions 110, end portions 110 having a greater axial wider than middle portion 108. Each end portion 110 has a curved side 112 facing low pressure side $P_L$ of seal cavity 101. In one embodiment, one end portion 110 is a radial inner diameter relative to an engine centerline, and the opposing end portion 110 is a radial outer diameter relative to the engine centerline.

Seal 106 is a "floating" seal because it is not attached or fixed to either static part 102, 104, and seal 106 engages against a sealing surface only by pressure, as discussed herein. End portions 110 are shaped so that they each fit inside their corresponding groove 103, but end portions 110 have a width smaller than a width of groove 103 such that end portions 110 are not interference-fit within grooves 103, and seal 106 is free to move within groove 103.

Figure 3:
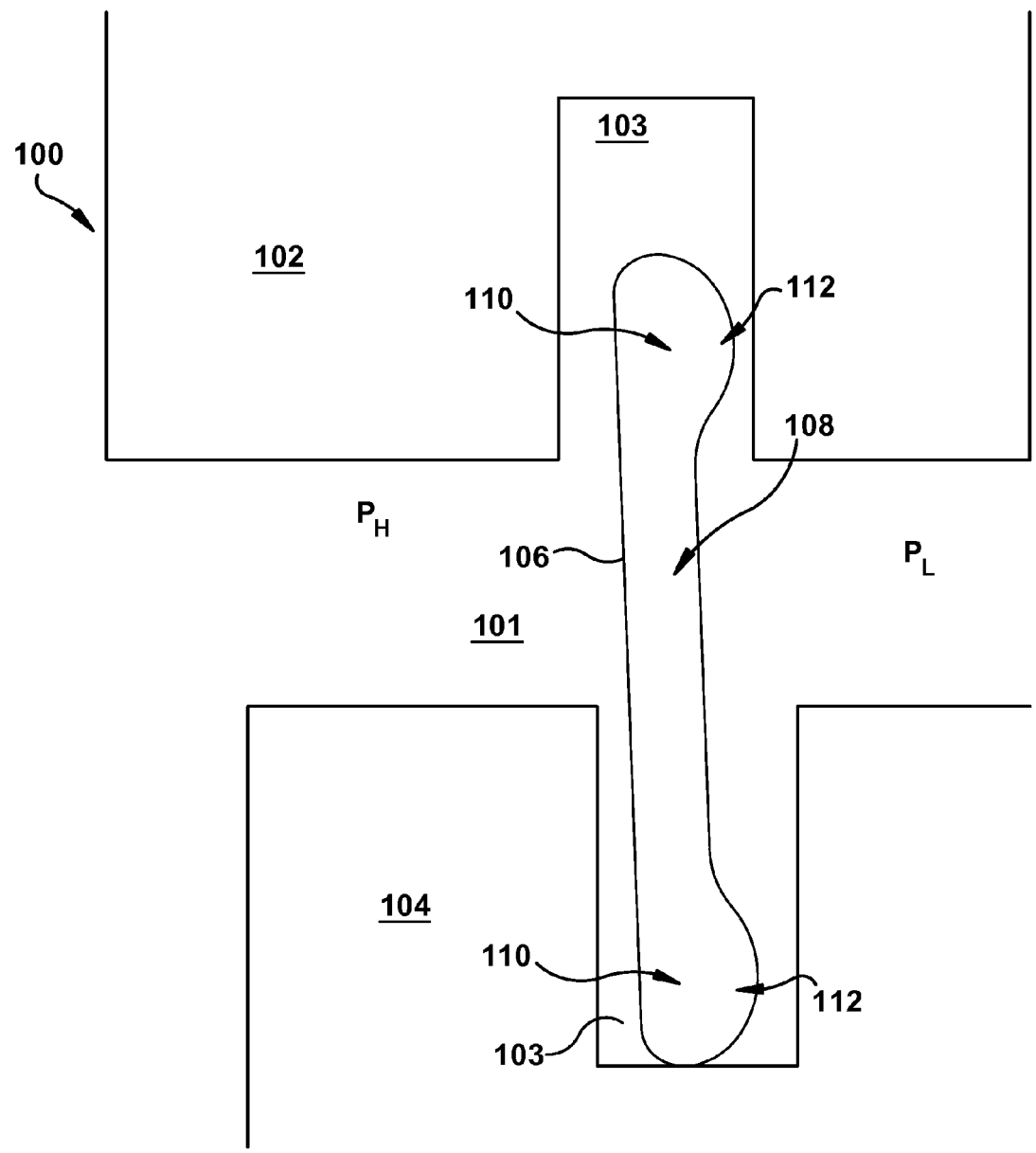
FIG. 3 shows a cross-sectional view of a circumferential floating seal in a non-sealing state, according to an embodiment of the invention.

Floating seal assembly 100 is pressure-driven, in other words, once a pressure differential across seal assembly 100 hits a threshold, or critical, value, seal 106 engages. As such, floating circumferential seal 106 is configured to move between a first, non-sealing, position (as shown in FIG. 3) and a second, sealing, position (as shown in FIG. 2), in response to a pressure differential change across seal cavity 101. In a sealing position, as shown in FIG. 2, where a pressure differential across sealing cavity 101 reaches a threshold value, end portions 110, specifically an apex of curved sides 112 engage a low pressure side of seal cavity 101. This forms a continuous line of contact between curved sides 112 and static parts 102, 104, thus creating a seal. In a non-sealing position, i.e., where the pressure differential is below the threshold value, as shown in FIG. 3, seal 106 drops down into groove 103 in static part 104 due to gravity, and goes out of contact with the low pressure side of seal cavity 101.

It is noted that in either the sealing or non-sealing position, middle portion 108 of circumferential floating seal 106 does not engage the low pressure side of static parts 102, 104 or seal cavity 101. Instead, the sealing is accomplished with a line of contact formed between each curved side 112 of end portions 110 and the low pressure side of seal cavity 101. Therefore, curved sides 112 of end portions 110 ensure that only one line of contact (only at the apex of curved sides 112) at each end of floating seal 106 is maintained with static parts 102, 104. In contrast to a flat seal, where middle portion 108 would also contact low pressure sides of static parts 102, 104 (i.e., contact across the entire seal), the dog bone shape of seal 106 minimizes issues that can arise with surface area irregularities. In other words, with a flat seal, any surface area irregularity could result in a loss of sealing capability, as opposed to the dog bone shape of seal 106, with only two lines of contact with static parts 102, 104. In addition, in a flat seal, stress would be across the whole seal, but with seal 106, the stress is concentrated along the lines of contact at either end of seal 106. Also, curved portions 112 allow a seal across static parts 102, 104 even if parts 102, 104 are not aligned axially. For example, as shown in FIGS. 1 and 2, parts 102, 104, and corresponding grooves 103 are not exactly axially aligned, yet seal 106 maintains a line of contact on each end 110 through curved sides 112.

Figure 4:
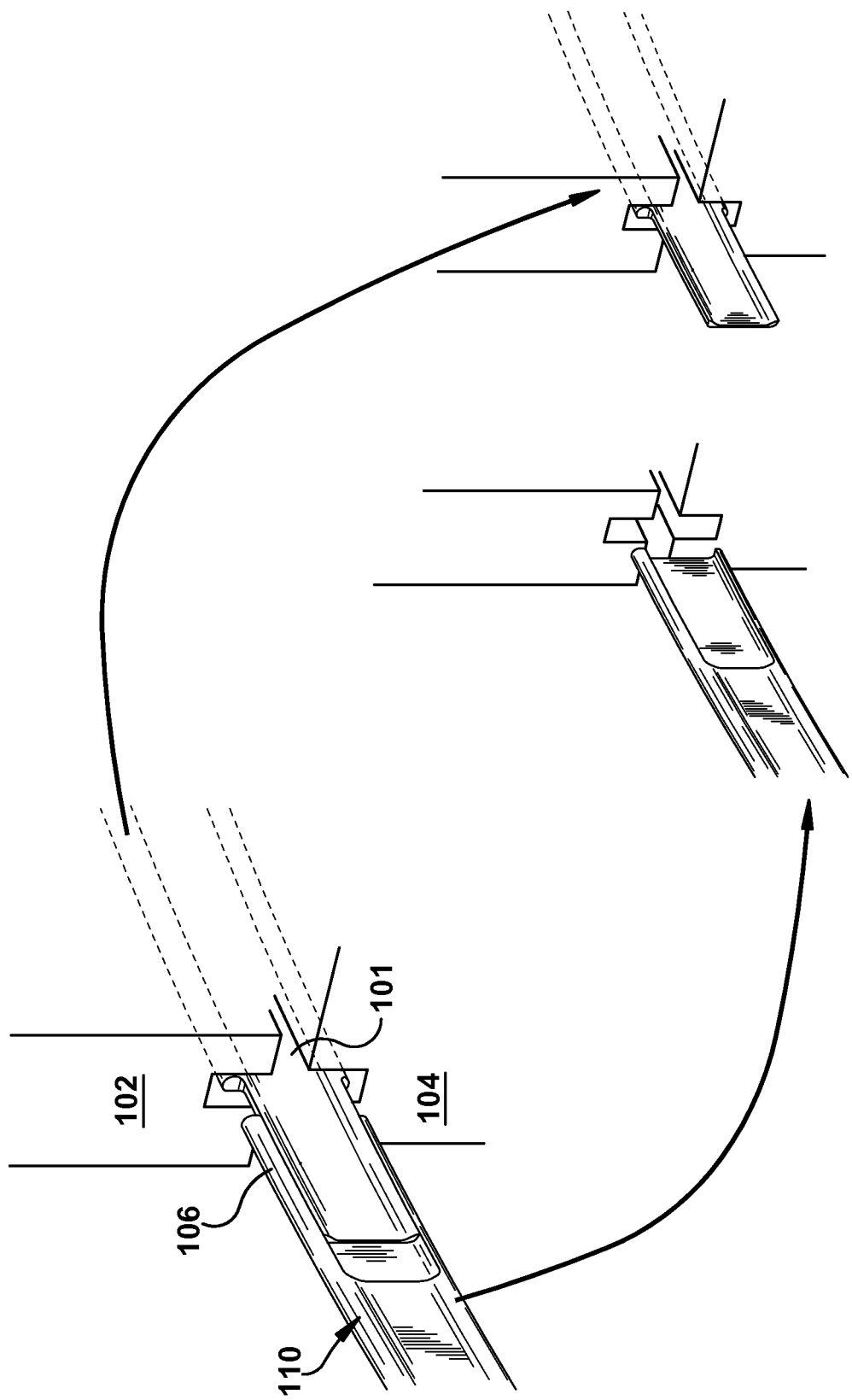
FIG. 4 shows a perspective view of a circumferential floating seal, including exploded views of arcuate sections of the circumferential floating seal, according to an embodiment of the invention.

As shown in FIG. 4, floating seal 106 is a circumferential seal and can comprise 360 degree circumferential ring seal, which can be axially assembled, or can be comprised of a plurality or series of arcuate sections, each arcuate section configured to matingly engage an adjacent arcuate section to maintain the continuous line of contact between end portions 110 and the low pressure side of seal cavity 101. In one example, arcuate sections can comprise male or female sections that are configured to slide into one another, as shown in FIG. 4. The male and female arcuate sections can each be cut through an apex of end portions 110 so that when the sections are fitted together, the continuous line of contact with the lower pressure side of cavity 101 is maintained.

As is known in the art, static parts 102, 104 although generally stationary, do have some transient movement with respect to each other, for example, due to heating/cooling, start-up, shut-down, etc. This transient movement is heightened when static parts 102, 104 have different coefficients of thermal expansion (CTE). These CTE mismatches can cause the static parts to expand and contract differently, thus floating seal assembly 100 is used to maintain a seal between static parts 102, 104 despite their relative movement. Thus, floating seal assembly 100 provides a more robust seal than a conventional compliant seal because floating seal assembly 100 has a greater transient travel capability.

Floating seal 106 can comprise any compliant material or non-compliant metal as desired, or any known or later developed sealing material. While floating seal 106 is shown in the figures as a so-called dog bone shaped seal, it is understood that other shaped seals are possible to ensure a line of contact (or areas of contact) along end portions of the seal, but not along a middle portion of the seal. Floating seal 106 can have a length as required to fit within grooves 103 of static parts 102, 104. At a minimum, seal 106 needs to be long enough to stay within grooves 103 during a maximum transient condition, i.e., when static parts 102, 104 are farthest away from each other. Seal 106 also needs to be long enough to stay within grooves 103 when in a non-sealing state. In other words, when seal 106 is disengaged from the low pressure side of seal cavity 101, seal 106 will drop down into groove 103 in static part 104 due to gravity. In this non-sealing state, seal 106 needs to be long enough so the upper end portion 110 stays in groove 103 in static part 102.

Figure 5:
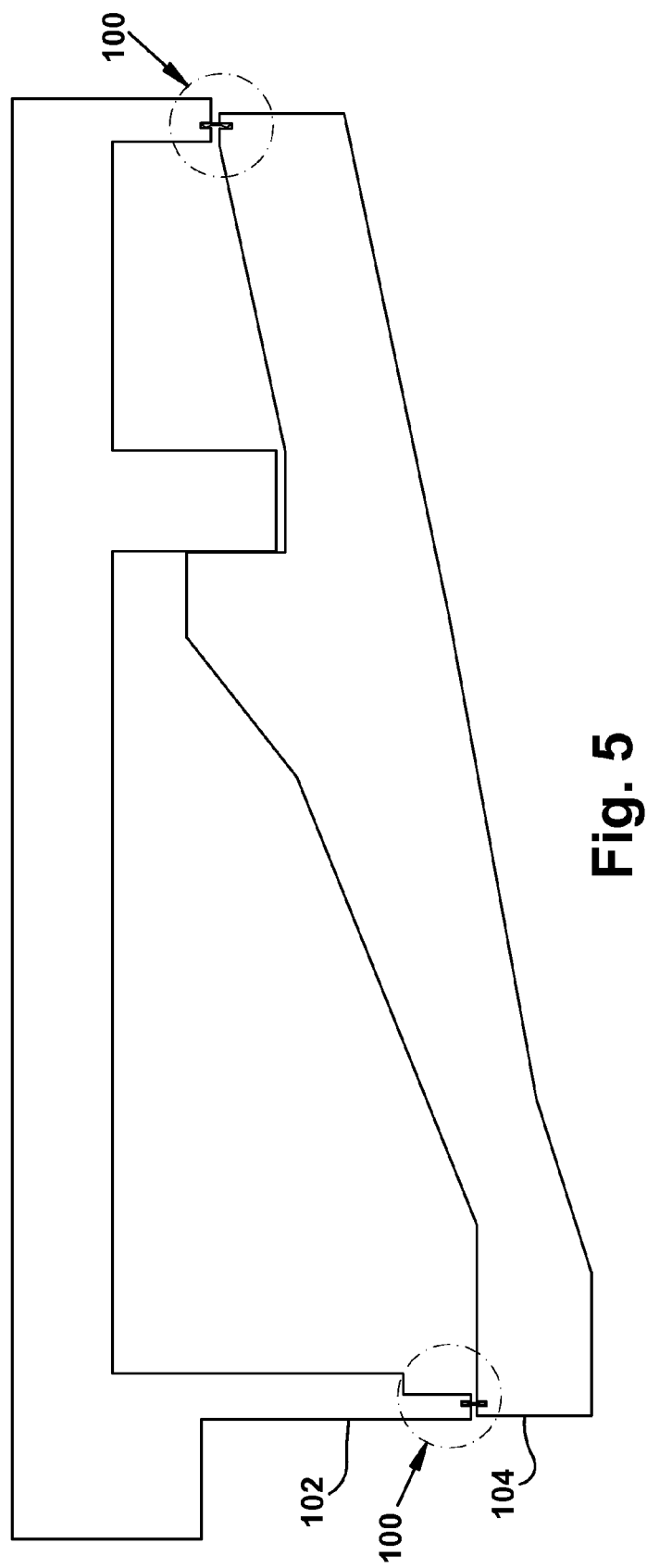
FIG. 5 shows a cross-sectional view of an exemplary gas turbine including two circumferential floating seals according to an embodiment of the invention.

Turning to FIG. 5, one example of where seal assembly 100 can be used to seal two static parts is shown. As shown in FIG. 5, seal assembly 100 is used to seal an inner and outer casing in a turbomachine. In this example, static part 102 comprises an outer casing, and static part 104 comprises an inner casing. Two examples of a floating seal assembly 100 sealing inner and outer casings, i.e., static parts 102, 104 is shown in FIG. 5. However, it is understood that floating seal assembly 100 disclosed herein can be used to seal any static parts where a floating seal would be advantageous, e.g., where static parts have mismatched CTEs or transient movement with respect to each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the various embodiments of the present invention, including the best mode, and also to enable any person skilled in the art to practice the invention, including making and using any devices or systems and performing any incorporated methods. The patentable scope of the various embodiments of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A floating seal assembly for sealing two static parts of a turbomachine, the two static parts having opposing grooves defining a seal cavity, the floating seal assembly comprising:
    a floating circumferential seal having a middle portion, and opposing end portions, each opposing end portion positioned within a groove in one of the static parts, wherein each end portion has a curved side facing a low pressure side of the seal cavity, each curved side configured to engage the low pressure side of the seal cavity in response to a pressure differential across the seal cavity reaching a threshold value,
    wherein the floating circumferential seal includes a plurality of sections,
    wherein each of the plurality of sections includes a male part on a first end of each segment and a female part on a second end of each segment, the male part including a portion of each apex of each curved side at the first end of each segment and the female part including a portion of each apex of each curved side at the second end on of each segment, and
    wherein the male and female parts of each section are configured to matingly engage a corresponding male or female part of an adjacent section in the plurality of sections such that a continuous line of contact is formed in response to each curved side of each end portion of the floating circumferential seal engaging the low pressure side of the seal cavity.

2. The floating seal assembly of claim 1, wherein the floating circumferential seal is configured to move between a first, non-sealing, position and a second, sealing, position in response to a change in the pressure differential across the seal cavity.

3. The floating seal assembly of claim 2, wherein in a sealing or non-sealing position, the middle portion of the circumferential floating seal does not engage the low pressure side of the seal cavity.

4. The floating seal assembly of claim 1, wherein the plurality of sections includes a plurality of arcuate sections.

5. The floating seal assembly of claim 4, wherein the plurality of arcuate sections form a circumferential ring in response to each arcuate section matingly engaging an adjacent arcuate section.

6. The floating seal assembly of claim 1, wherein the end portions of the floating circumferential seal have a greater axial width than an axial width of the middle portion of the floating circumferential seal.

7. The floating seal assembly of claim 1, wherein the end portions of the floating circumferential seal are not affixed to the grooves in each static part.

8. The floating seal assembly of claim 1, wherein only the apex of each curved side engages a low pressure side of the seal cavity in response to the pressure differential across the seal cavity reaching the threshold value.

9. The floating seal assembly of claim 1, wherein the static parts comprise casings, and wherein the turbine includes a gas turbine.

10. A turbomachine having an inner casing and an outer casing, the inner and outer casings having opposing grooves defining a seal cavity, the turbomachine comprising:
   a floating seal assembly for sealing the seal cavity between the inner casing and the outer casing, the floating seal assembly including:
      a floating circumferential seal having a middle portion, and opposing end portions, each opposing end portion positioned within a groove in one of the static parts, wherein each end portion has a curved side facing a low pressure side of the seal cavity, each curved side configured to engage the low pressure side of the seal cavity in response to a pressure differential across the seal cavity reaching a threshold value,
      wherein the floating circumferential seal includes a plurality of sections,
      wherein each of the plurality of sections includes a male part on a first end of each segment and a female part on a second end of each segment, the male part including a portion of each apex of each curved side at the first end of each segment and the female part including a portion of each apex of each curved side at the second end of each segment, and
      wherein the male and female parts of each section are configured to matingly engage a corresponding male or female part of an adjacent section in the plurality of sections such that a continuous line of contact is formed in response to each curved side of each end portion of the floating circumferential seal engaging the low pressure side of the seal cavity.

11. The turbomachine of claim 10, wherein the floating circumferential seal is configured to move between a first, non-sealing, position and a second, sealing, position in response to a change in the pressure differential across the seal cavity.

12. The turbomachine of claim 11, wherein in a sealing or non-sealing position, the middle portion of the circumferential floating seal does not engage the low pressure side of the seal cavity.

13. The turbomachine of claim 10, wherein the plurality of sections includes a plurality of arcuate sections.

14. The turbomachine of claim 10, wherein the end portions of the floating circumferential seal have a greater axial width than an axial width of the middle portion of the floating circumferential seal.

15. The turbomachine of claim 10, wherein the end portions of the floating circumferential seal are not affixed to the grooves in each static part.

16. The turbomachine of claim 10, wherein only the apex of each curved side engages a low pressure side of the seal cavity in response to the pressure differential across the seal cavity reaching the threshold value.

17. The turbomachine of claim 10, wherein the turbomachine includes a gas turbine.

18. The turbomachine of claim 13, wherein the plurality of arcuate sections form a circumferential ring in response to each arcuate section matingly engaging an adjacent arcuate section.

* * * * *